United States Patent
Nguyen et al.

(10) Patent No.: US 6,401,194 B1
(45) Date of Patent: *Jun. 4, 2002

(54) EXECUTION UNIT FOR PROCESSING A DATA STREAM INDEPENDENTLY AND IN PARALLEL

(75) Inventors: Le Trong Nguyen, Monte Sereno; Heonchul Park, Cupertino; Roney S. Wong, Sunnyvale; Ted Nguyen, Saratoga; Edward H. Yu, Newark, all of CA (US)

(73) Assignee: Samsung Electronics Co., Ltd., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/790,142

(22) Filed: Jan. 28, 1997

(51) Int. Cl.$^7$ .............. G06F 9/302; G06F 9/38; G06F 13/40; G06F 7/38

(52) U.S. Cl. .............. 712/210; 712/212; 712/7; 712/8; 712/9; 712/4; 708/507; 708/524; 708/682; 708/550; 710/65; 710/66; 710/127; 710/50

(58) Field of Search ................ 712/2, 3, 4, 14, 712/7, 23, 394, 203, 222, 37, 210, 212, 221, 300, 22, 215, 201, 235; 710/50, 51, 52, 54, 56, 66, 127, 126, 128; 708/496, 513, 550, 507, 524, 682; 711/171, 173, 172, 206, 201, 212, 209

(56) References Cited

U.S. PATENT DOCUMENTS

| | | | | |
|---|---|---|---|---|
| 4,589,067 A | * | 5/1986 | Poster et al. ............. | 364/200 |
| 4,833,635 A | * | 5/1989 | McCanny et al. ......... | 708/420 |
| 5,222,241 A | * | 6/1993 | Murakami et al. ........ | 395/775 |
| 5,226,126 A | * | 7/1993 | McFarland et al. ....... | 395/394 |
| 5,268,855 A | * | 12/1993 | Mason et al. ............. | 364/748 |
| 5,301,285 A | * | 4/1994 | Hanawa et al. ........... | 395/394 |
| 5,347,639 A | * | 9/1994 | Rechtschaffen et al. ... | 712/23 |
| 5,430,884 A | * | 7/1995 | Beard et al. .............. | 395/800 |
| 5,483,643 A | * | 1/1996 | Sato ......................... | 711/1 |
| 5,499,350 A | * | 3/1996 | Uchida et al. ............ | 395/375 |
| 5,517,656 A | * | 5/1996 | Shi ........................... | 712/29 |
| 5,517,666 A | * | 5/1996 | Ohtani et al. ............. | 395/800 |
| 5,526,039 A | * | 6/1996 | Hutchinson ............... | 348/47 |
| 5,530,661 A | * | 6/1996 | Garbe et al. .............. | 708/420 |
| 5,560,039 A | * | 9/1996 | Dulong .................... | 395/800 |
| 5,596,767 A | * | 1/1997 | Guttag et al. ............. | 712/34 |
| 5,625,834 A | * | 4/1997 | Nishikawa ................ | 395/800 |
| 5,630,161 A | * | 5/1997 | Branco et al. ............ | 395/800 |
| 5,768,594 A | * | 6/1998 | Blelloch et al. .......... | 395/706 |
| 5,781,753 A | * | 7/1998 | McFarland et al. ....... | 395/394 |
| 5,809,292 A | * | 9/1998 | Wilkinson et al. ....... | 712/222 |
| 5,835,793 A | * | 11/1998 | Li et al. ................... | 712/300 |
| 5,951,629 A | * | 9/1999 | Wertheim et al. ........ | 708/517 |
| 5,983,336 A | * | 11/1999 | Sakhin et al. ............. | 712/24 |

OTHER PUBLICATIONS

Alexxandridis, "Bit–sliced Microprocessor Architecture", IEEE 1978, pp. 69–92.*

* cited by examiner

*Primary Examiner*—Daniel H. Pan
(74) *Attorney, Agent, or Firm*—Skjerven Morrill MacPherson LLP (57) ABSTRACT

A vector processor provides a data path divided into smaller slices of data, with each slice processed in parallel with the other slices. Furthermore, an execution unit provides smaller arithmetic and functional units chained together to execute more complex microprocessor instructions requiring multiple cycles by sharing single-cycle operations, thereby reducing both costs and size of the microprocessor. One embodiment handles 288-bit data widths using 36-bit data path slices. Another embodiment executes integer multiply and multiply-and-accumulate and floating point add/subtract and multiply operations using single-cycle arithmetic logic units. Other embodiments support 8-bit, 9-bit, 16-bit, and 32-bit integer data types and 32-bit floating data types.

22 Claims, 6 Drawing Sheets

EXECUTION UNIT FOR PROCESSING A DATA STREAM INDEPENDENTLY AND IN PARALLEL

BACKGROUND OF THE INVENTION

1. Field of the Invention

This invention relates generally to data processors, and more particularly to execution units within data processors.

2. Description of Related Art

Most microprocessors used today employ 32-bit data paths, and a trend for microprocessor design has been to increase data path widths to increase processing power. Increasing the width of data paths allows more bits of data to be processed per cycle. However, with conventional microprocessor architectures, simply increasing the width of data paths increases the data element size, for example, from 32-bit to 64-bit, and may improve accuracy in certain calculations, but does not increase the processing rate for data elements. Increasing the width of the data path also requires larger registers and more complex arithmetic logic units (ALUs), thereby increasing the size and complexity of the microprocessor.

Usable processing power may be increased by increasing the number of types of data operations implemented. Some basic operations, such as integer add/subtract, can be implemented with relatively simple circuits, which are low cost and small. However, more complicated operations, such as floating point multiply, require more complex and larger circuits. To maximize performance, circuits are often designed specifically to implement individual operations, which proliferate the number of processing circuits in a microprocessor. Consequently, microprocessor chips are expanding in size and cost to support more operations and more complex operations.

Minimizing costs and chip area are important goals in microprocessor design. Therefore, an execution unit data path which processes large data streams within multiple data elements and allows complex operations to be performed while reducing both chip size and costs is desired.

SUMMARY OF THE INVENTION

In accordance with an aspect of the invention, a processor provides a data path wherein the input data stream is divided into smaller data "slices". Processing occurs on each data slice in parallel with the other slices, thereby allowing larger data widths and multiple data elements to be processed in less time. In one embodiment, a 288-bit data stream is divided into eight 36-bit slices. Each of the 36-bit slices can support four 8-bit, four 9-bit, two 16-bit, or one 32-bit data elements. The 288-bit data stream is processed by performing parallel operations on the eight 36-bit slices. In a similar manner, any large data stream can be handled by processors containing smaller functional and arithmetic units by adding smaller width data paths in parallel.

According to another aspect of the invention, a processor execution unit is divided into smaller functional units, and instead of executing each complicated multi-cycle instruction with a single complex circuit, the smaller functional units are chained together as required to execute complicated instructions. The smaller functional units, which can be single-cycle units, can be shared or used for a number of different types of instructions so that the total amount of processing circuitry is reduced. One embodiment performs 36-bit integer multiply, integer multiply-and-accumulate (MAC), floating point add/subtract, and floating point multiply operations using a combination of single-cycle multipliers, arithmetic logic units (ALUs), and accumulators.

For integer multiply, a first functional unit is a 32-bit multiplier that generates a 64-bit partial carry and a 64-bit partial sum in the first clock cycle. In the second clock cycle, a 36-bit adder contained in a first ALU adds the 32 low bits of the partial carry and sum, and a 36-bit adder in a second ALU adds the 32 high bits of the partial carry and sum. The second ALU also adds a possible incoming carry bit from the first ALU when the adders add data types with widths greater than 36 bits. The output of the two ALUs can be stored in an accumulator or in a register file as the product of two integers.

The operations for integer MAC are the same as for integer multiply, except that in the first clock cycle, a value in the accumulator which is to be added is transferred to the two ALUs. In the second clock cycle, the first and second ALUs then add the accumulator bits as well as the partial sum and carry bits to provide a result to the accumulator or register file. Therefore, both integer multiply and integer MAC are executed in two clock cycles, sharing a multiplier, two ALUs, and an accumulator.

Similarly, floating point add/subtract and floating point multiply operations can be simplified using the same multipliers, ALUs, and accumulators as for the integer operations. For floating point add/subtract, the first ALU, in a first clock cycle, aligns the exponents by determining the difference between the exponents and right shifting the smaller mantissa by an amount equal to the exponent difference. The common exponent is the larger of the two operands. Also in the first cycle, the first ALU adds the mantissas and transfers the result to the second ALU if the shift amount was one or less. Otherwise, the aligned operands are transferred directly to the second ALU.

In the second clock cycle, the second ALU adds the mantissas of the aligned operands if the shift amount was greater than one. The result, either from the first ALU or from the adder in the second ALU, is normalized by right shifting the mantissa and incrementing the exponent if overflow occurs or by left shifting the mantissa and subtracting that amount from the common exponent, where the shift amount is equal to the number of leading zeros. Floating point add/subtract is completed in the second clock cycle after the result is rounded in the second ALU, according to one of four rounding modes existing in this embodiment. The result is then transferred and stored.

Whereas the above three multi-cycle instructions required two clock cycles to complete, floating point multiply requires three clock cycles. The same multiplier as above generates a carry and a sum from the mantissas of the two operands in the first clock cycle. In the second clock cycle, the first ALU adds the most significant bits of the carry and sum and also adds the two exponents of the operands. In the third clock cycle, the second ALU normalizes and rounds the result and then transfers the final result.

Consequently, a microprocessor that might have required four large and expensive circuits to execute the above-mentioned multi-cycle instructions can now execute the same instructions by employing a single-cycle multiplier, two single-cycle ALUs, and an accumulator according to one embodiment of the invention. Because these single-cycle units are typically smaller and inexpensive and because many functions can share various single-cycle units, the size and cost of a processor is reduced. Aspects of the invention can be applied to other instructions, data types, data widths, and data formats, and therefore these descriptions are not meant to be limiting.

BRIEF DESCRIPTION OF THE DRAWINGS

Use of the same reference symbols in different figures indicates similar or identical items. Appendix lists Tables A.1–A.8.

DETAILED DESCRIPTION OF THE PREFERRED EMBODIMENTS

The present invention provides an execution unit data path for a vector processor which allows a large data stream to be processed and complex operations to be performed while reducing both the cost and size of the integrated circuit. A large vector can be broken up into smaller "slices" of data for processing. In this arrangement, the slices can be processed in parallel using conventional arithmetic logic units (ALUs) and registers so that the processing time for the large vector is the same as for an individual slice. Furthermore, processing of each slice is simplified by chaining together functional units, where each unit operates for one clock cycle, and the chain of functional units implements more complicated multi-cycle operations. Because many operations can share these various functional units, the integrated circuit is less expensive and smaller than a circuit using many functional units dedicated to specific complex operations.

Figure 1:
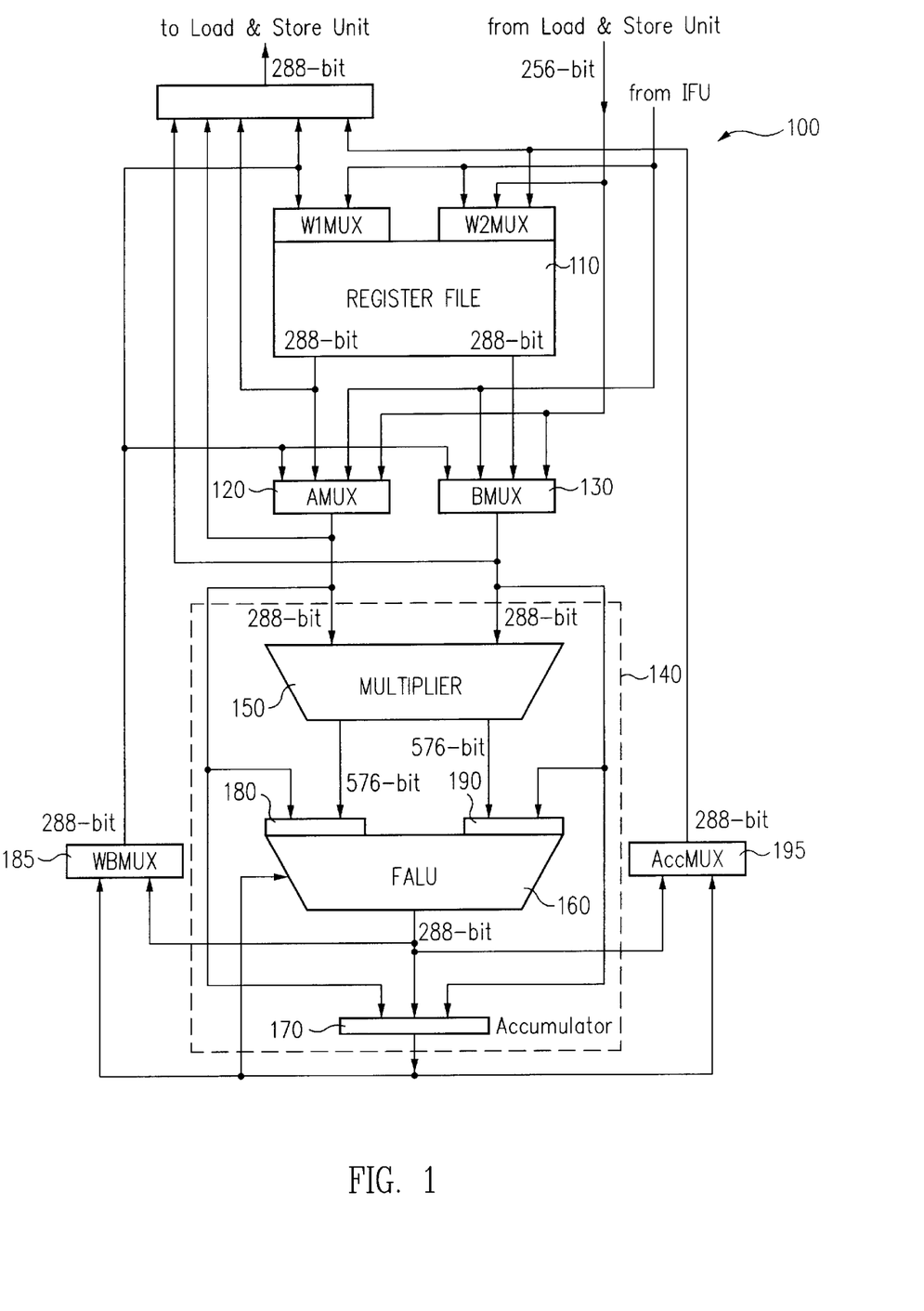
FIG. 1 is a block diagram showing a data path for a 288-bit data stream.

FIG. 1 shows an 288-bit data path 100 for a vector processor in accordance with an embodiment of the invention. Co-owned U.S. patent application Ser. No. 08/699,597, entitled "Single-Instruction-Multiple-Data Processing in a Multimedia Signal Processor", filed Aug. 19, 1996, now U.S. Pat. No. 6,058,456 issued on May 2, 2000, which is hereby incorporated by reference in its entirety, describes a vector processor containing a 288-bit data path 100 and an instruction set for the vector processor. This description focuses on specific aspects of the execution unit and execution stages of instruction execution pipelines. Suitable instruction and operand fetch stages and store stages are described in patent application Ser. No. 08/699,597, filed Aug. 19, 1996, now U.S. Pat. No. 6,058,465.

In FIG. 1, data is accessed from a register file 110, which may contain multiple banks of scalar and vector data registers, from memory via a load/store unit, or from an immediate value of an instruction via an instruction fetch unit (IFU). Multiplexers 120 and 130 then select source operands for an execution unit data path 140 from various input ports. Execution unit data path 140 includes a multiplier 150, an arithmetic logic unit (FALU) 160, and a vector accumulator 170. Multiplexers 180 and 190 select the desired operands for processing by FALU 160, which outputs results to double-length accumulator 170 or through multiplexers 185 and 195 to register file 110 or the load/store unit.

Figure 2:
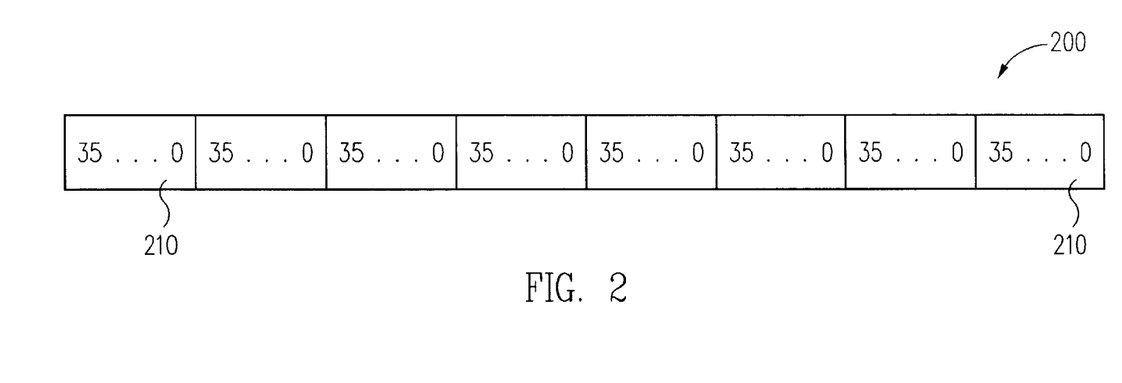
FIG. 2 is a diagram of a 288-bit data stream divided into slices according to an aspect of the present invention.
Figure 3:
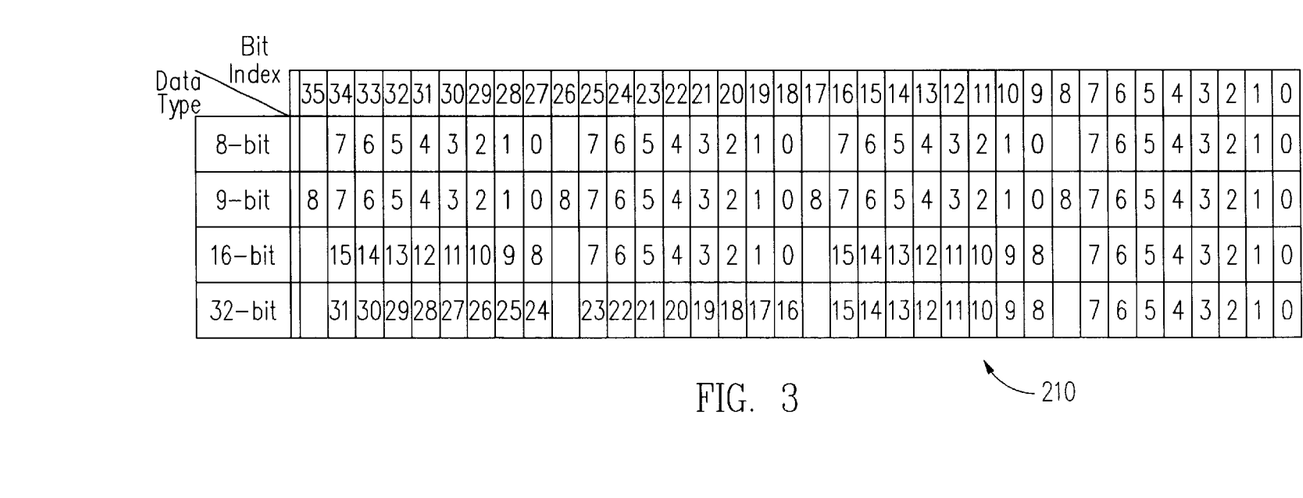
FIG. 3 is a table showing various data types within a data slice for an aspect of the present invention.

FIG. 2 shows the format of a 288-bit data stream 200, which is divided into eight 36-bit slices 210 according to one embodiment of the invention. Each slice 210 can accommodate multiple data types. In one embodiment, shown in FIG. 3, each slice 210 handles one 32-bit data word, two 16-bit data words, four 9-bit data words, or four 8-bit data words. In the Appendix, Table A.1 illustrates a method of adding multiple data types by inserting special bits at the data boundary locations. U.S. patent application Ser. No. 08/749,619, entitled "Adder which Handles Multiple Data with Different Data Types", filed Nov. 18, 1996, now U.S. Pat. No. 5,943,251 issued on Aug. 24, 1999, describes the above-mentioned 36-bit data slice and is incorporated by reference herein in its entirety.

Referring back to FIG. 1, in one embodiment, execution unit data path 140 is made up of eight smaller execution unit data paths. Multiplier 150 contains eight independent 36×36-bit multipliers, one in each of the data path slices. Each 36×36-bit multiplier can be configured as one multiplier, two 16×16 bit multipliers, or four 8×8-bit multipliers, depending on the data type. Similarly, FALU 160 contains eight 36-bit arithmetic logic units (FALU_36) that can perform logical, integer, and floating point arithmetic on multiple data types, and accumulator 170 contains eight 72-bit or double length accumulators for storing and transferring data. The data in each of the eight slices can then be processed in parallel using conventional multipliers, ALUs, and accumulators so that a 288-bit vector is processed in the time required to operate on a 36-bit data stream.

Figure 4:
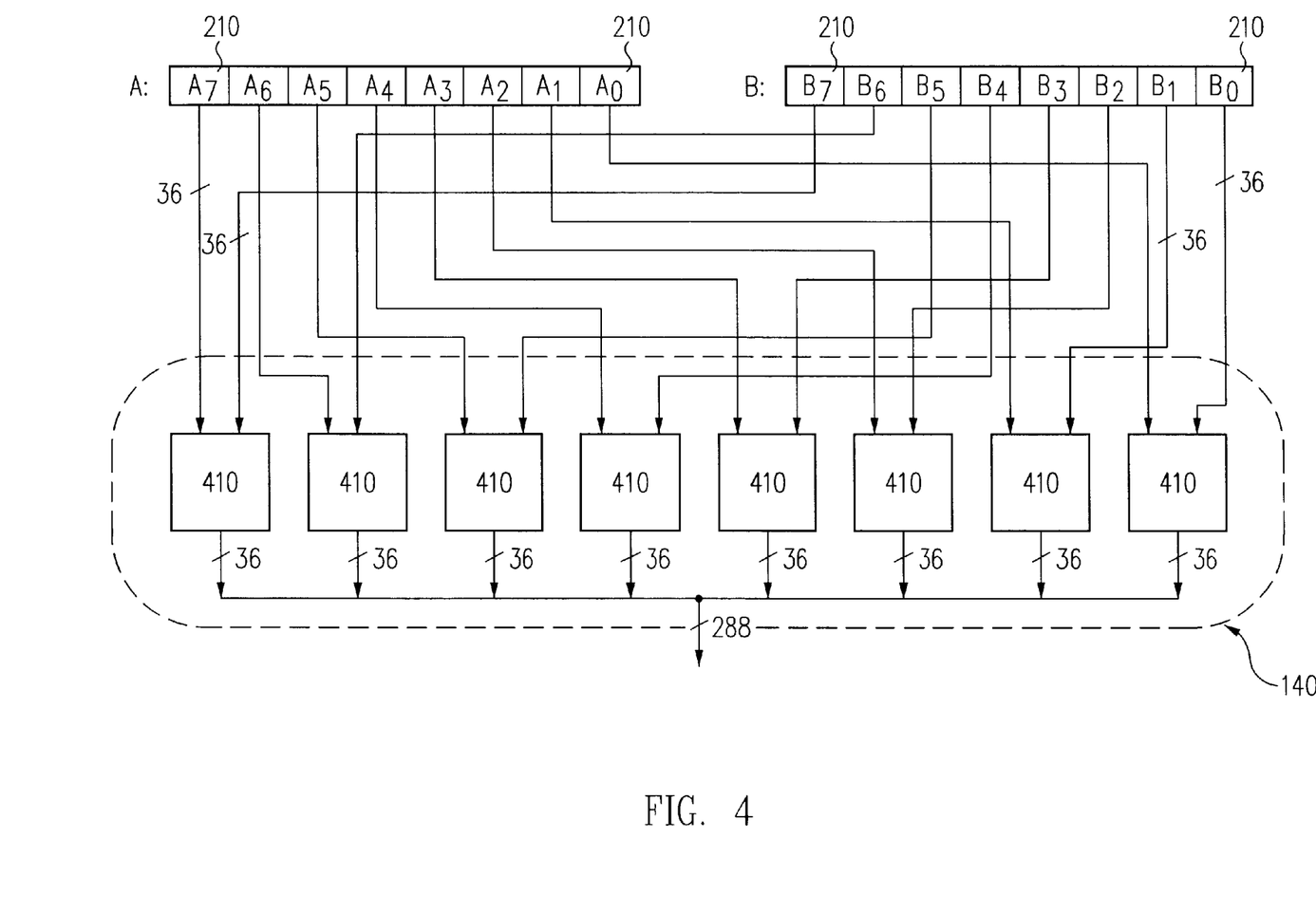
FIG. 4 is a block diagram of a wide execution data path divided into multiple separate data path slices for an embodiment of the present invention.

FIG. 4 illustrates two 288-bit vector operands, A[287:0] and B[287:0], each divided into eight 36-bit slices 210, with each slice 210 processed through a data path slice 410. Operands A[287:0] and B[287:0] are selected from various input ports by respective multiplexers 120 and 130 in FIG. 1. Eight data path slices 410 make up execution unit data path 140 of FIG. 1, with each data path slice 410 containing a 36×36-bit multiplier, a 36-bit FALU, and a 72-bit accumulator. Data path slices 410 can be any combination of known multipliers, ALUs, and registers which are capable of handling the desired microprocessor operations. U.S. patent application Ser. No. 08/734,277, entitled "Parallel Multiplier that Supports Multiple Numbers with Different Bit Lengths", filed Oct. 21, 1996, now U.S. Pat. No. 5,943,250 issued on Aug. 24, 1999, describes a suitable multiplier for handling the four data types. U.S. patent application Ser. No. 08/746,881, entitled "Modular Computational Structure that Supports Instructions for Video Processing", filed Nov. 18, 1996, now abandoned, describes a suitable ALU for performing arithmetic integer operations on multiple data types. U.S. patent applacation Ser. No. 08/751,563, entitled "Fused Floating-Point Multiply-and-Accumulate Unit with Carry Correction", filed Nov. 18, 1996, now U.S. Pat. No. 5,928,316 issued on Jul. 27, 1999, describes a suitable ALU for performing floating point add/subtract, multiply, and multiply-and-accumulate (MAC) operations. All three are incorporated by reference herein in their entirety.

Consequently, according to one embodiment of the invention, data path slice 410 contains functional units, each executing simple instructions. More complex instructions can be performed by chaining together and sharing functional units.

Figure 5:
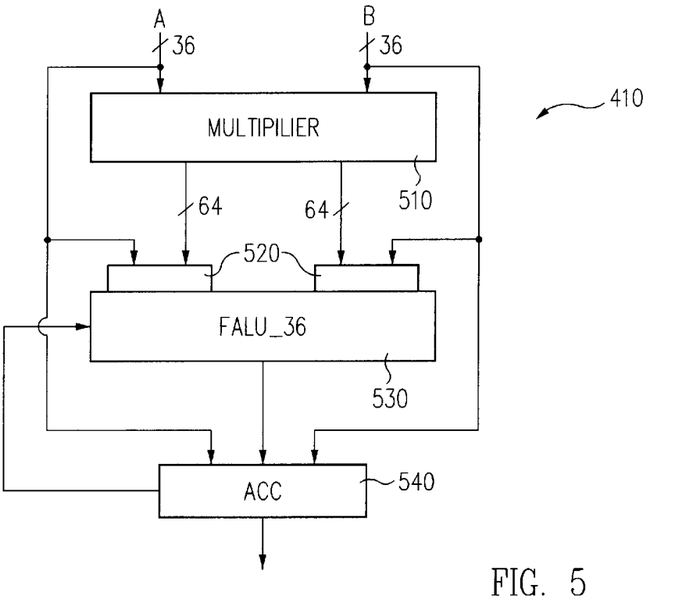
FIG. 5 is a block diagram of a data path slice of FIG. 4.

FIG. 5 is a block diagram of data path slice 410, containing a multiplier 510, two multiplexers 520, a 36-bit ALU (FALU_36) 530, and a 72-bit accumulator 540. Multiplier 510 operates on two 36-bit operands, A and B, each containing one 32-bit, two 16-bit, two 9-bit, or four 8-bit data elements. Multiplier 510 then generates partial products, resulting in a 64-bit partial carry and a 64-bit partial sum output. One such multiplier includes a Booth decoder, a partial product generator, selection logic, and a carry-save adder employing a Wallace tree structure. The Booth decoder recodes an operand B while the partial product generator generates multiples of operand A by performing shifts and 2's complement or sign encoding operations. The selection logic selects partial products of operand A according to the recoded operand B and provides the selected partial products to the carry-save adder for addition. The adder then reduces the partial products to a partial carry and partial sum. Multiplexers 520 select whether FALU_36 530 operates on the partial sums and carries or on operands A and B. Simultaneously, FALU_36 530 can process data in accumulator 540, which stores data in double-length registers. According to an aspect of the present invention, FALU_36 530 is broken down into smaller ALUs to perform the necessary microprocessor instructions.

One way to categorize microprocessor instructions is by the number of clock cycles required to perform an instruction. In general, single-cycle instructions are easier and require less chip area to implement than do multi-cycle instructions. Therefore, implementing multi-cycle instructions by connecting and sharing single-cycle functional units rather than using a dedicated multi-cycle functional unit for each instruction saves chip area and cost. In the Appendix, Tables A.2–A.8 describe the set of instructions for a vector processor in accordance with an exemplary embodiment of the present invention. Integer multiply and multiply-and-accumulate (MAC) and floating point add/subtract and multiply are multiple-cycle instructions that are implemented by executing a series of single-cycle instructions.

Figure 6:
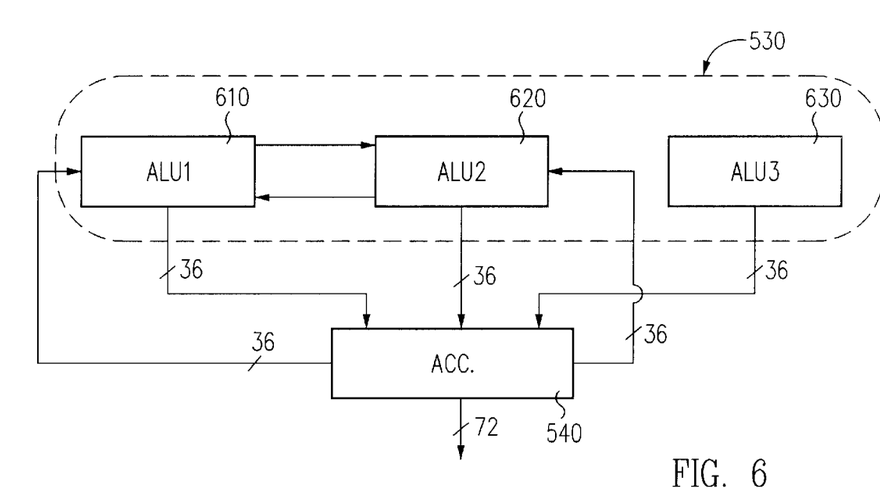
FIG. 6 is a block diagram of an arithmetic logic unit (ALU) of FIG. 5.

FIG. 6 is a general block diagram showing FALU_36 530 consisting of ALUs, ALU1 610, ALU2 620, and ALU3 630, along with paths to accumulator 540 necessary to perform the instructions in Tables A.2–A.8. ALU1 610 executes the set of instructions in logical class (Table A.2), shift and rotate class (Table A.3), MPEG class (Table A.5), data type conversion class (Table A.6), and inter-element arithmetic class (Table A.7). ALU3 630 executes the inter-element move class set of instructions in Table A.8. The arithmetic class instructions in Table A.4 can be executed through various combinations of ALU1 610, ALU2 620, and multiplier 510, all of which perform one clock cycle operations.

ALU1 610, ALU2 620, and accumulator 540 are all connected together to allow data transfer between each unit for performing the multi-cycle arithmetic instructions. Because ALU3's single-cycle instructions are not needed to implement multi-cycle instructions, ALU3 630 is not connected to ALU1 610 or ALU2 620. ALU1 610 and ALU2 620 are connected so that ALU2 620 can process results from ALU1 610 when required for multi-cycle instructions.

Figure 7:
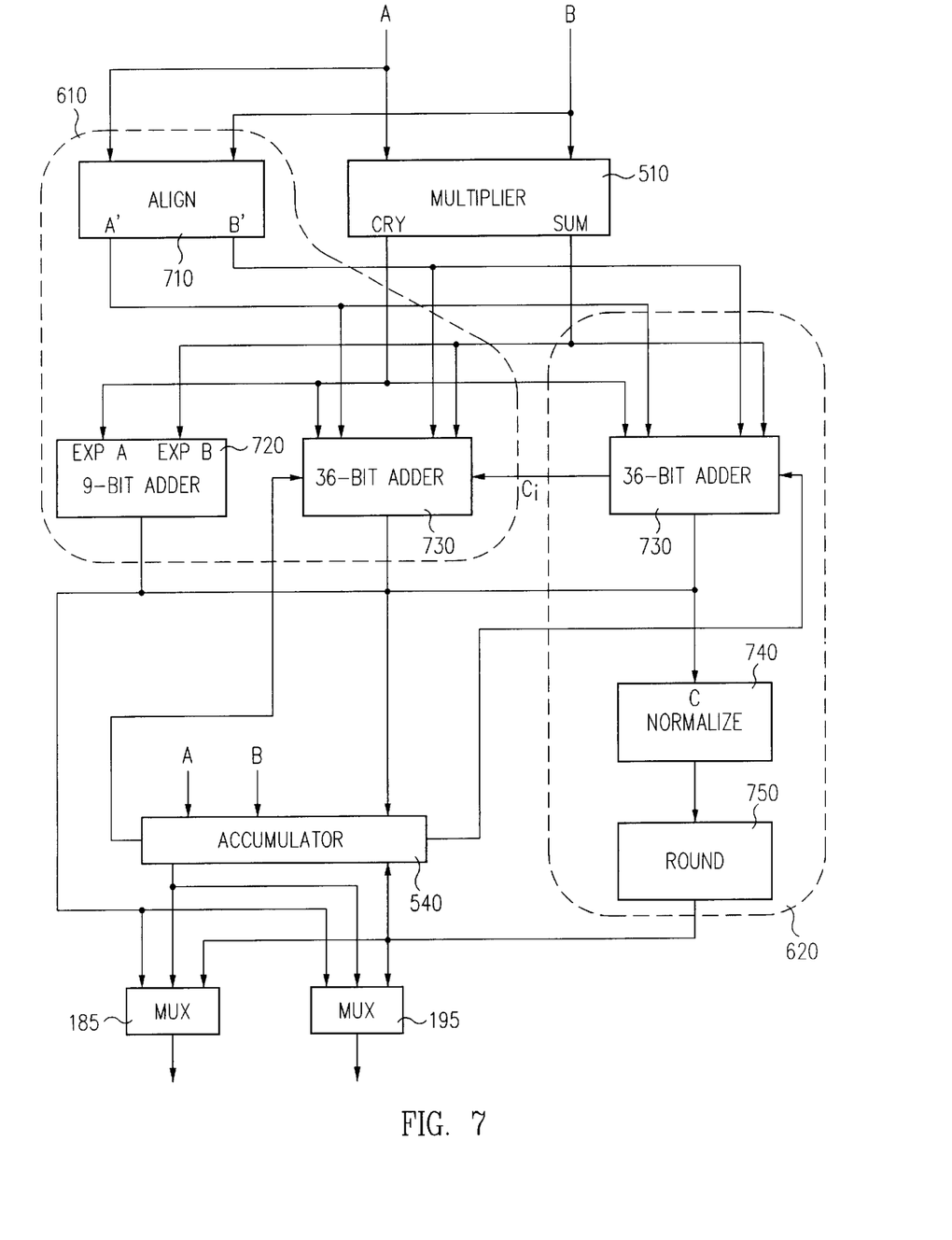
FIG. 7 is a block diagram of the data path slice of FIG. 4 for performing integer multiply and MAC and floating point add/subtract and multiply operations.

FIG. 7 is a more detailed block diagram of data path slice 410 showing functional blocks within ALU1 610 and ALU2 620 and interconnections between various elements of data path slice 410 for performing integer multiply and MAC and floating point add/subtract and multiply operations. FIG. 7 illustrates an embodiment of the invention whereby multi-cycle operations are implemented with a sequence of single-cycle instructions and functional units. ALU1 610 includes an align circuit 710, a 9-bit adder 720, and a 36-bit adder 730. ALU2 620 includes a 36-bit adder 735, a normalize circuit 740, and a rounding circuit 750.

Integer MAC operations are executed in two clock cycles using single-cycle instructions and functional units. During a first clock cycle of an integer multiply or MAC, 32-bit multiplier 510 generates a 64-bit partial carry and a 64-bit partial sum from 36-bit data slices, A and B. The 36-bit inputs, A and B, can represent one 32-bit integer, two 16-bit integers, two 9-bit integers, or four 8-bit integers. The 64-bit partial carry is divided into two 32-bit portions, a carry-low (CRYL[31:0]) representing bits 0–31 and a carry-high (CRYH[63:32]) representing bits 32–63. Similarly, the 64-bit partial sum is divided into a sum-low (SUML[31:0]) and a sum-high (SUMH[63:31]).

Also during the first clock cycle, accumulator 540 may fetch data for ALU1 610 and ALU2 620 depending on whether the instruction is a multiply or MAC. If a MAC operation is desired, accumulator 540 transfers the low bits (ACCL[35:0]) and the high bits (ACCH[71:36]) to the 36-bit adder 735 of ALU2 620 and the 36-bit adder 730 of ALU1 610, respectively. Accumulator 540 can include prior outputs of functional units or operand data A and B. During the second clock cycle, 36-bit 3:1 adders 730 and 735 contained in ALU1 610 and ALU2 620 add the partial carry bits, partial sum bits, and accumulator bits to each provide a 36-bit result to accumulator 540 and/or multiplexers 185 and 195. A carry bit $C_i$ is propagated from adder 735 of ALU2 to adder 730 of ALU1 for the 32-bit data type when the 36-bit adders combine to add input signals having a width greater than 36 bits. U.S. patent application Ser. No. 08/749,619, entitled "Adder which Handles Multiple Data with Different Data Types", filed Mar. 18, 1996 now U.S. Pat. No. 5,943,251, incorporated by reference above, describes an adder suitable for handling multiple data types.

Figure 8:
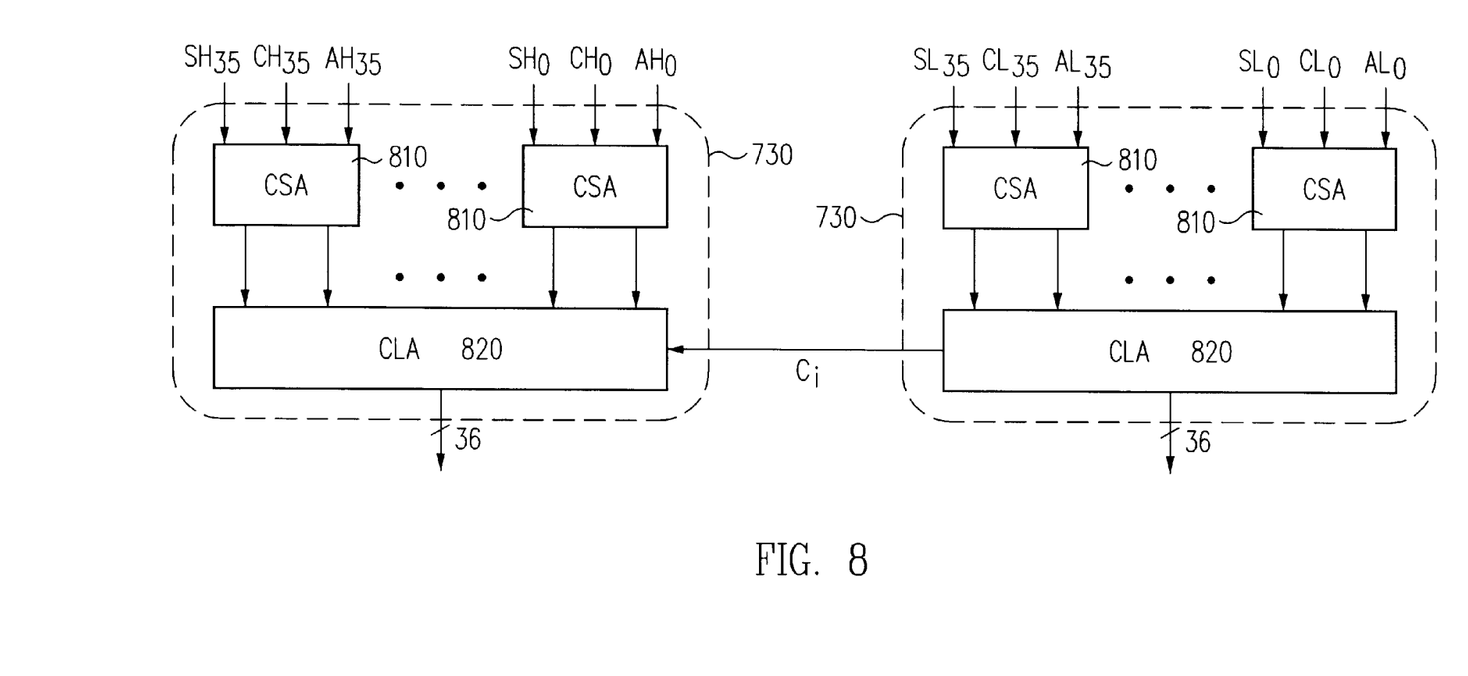
FIG. 8 is a block diagram of the adders of FIG. 7.

FIG. 8 is a block diagram of one embodiment of the 36-bit adders 730 and 735 of ALU1 610 and ALU2 620. Each ALU contains 36 3:2 carry-save adders (CSAs) 810 and one 36-bit carry-lookahead adder (CLA) 820. Each of the 36 CSAs 810 in adder 730 of ALU1 610 adds high sum, high carry, and high accumulator bits, resulting in 36 sum and carry bit pairs. Similarly, the 36 CSAs 810 in adder 735 of ALU2 620 add the low sum, low carry, and low accumulator bits. The resulting carry and sum bits are then added by two 36-bit CLAs 820 to produce the final result, which may be transferred to accumulator 540 or multiplexers 185 and 195. The carry-lookahead adder in adder 735 of ALU2 620 propagates carry bits from its most significant bit to the least significant bit position of CLA 820 in adder 730 of ALU1 610 when the input operands have data widths greater than 36 bits.

Referring back to FIG. 7, the same single-cycle ALUs can also be shared to implement floating point add/subtract and floating point multiply operations. Formats for floating point representations are well known in the art. The exemplary embodiment of the invention supports the IEEE-754 single precision data type, which is represented using 32 bits that include 23 bits indicating a mantissa, eight bits indicating an exponent, and one bit indicating a sign. These 32 data bits are located in the positions indicated in FIG. 3 for the 32-bit data type.

FIG. 7 further illustrates performing floating point add/subtract in two clock cycles using the same functional units as for integer operations described above. Depending on the type of addition required, ALU2 620 accepts either aligned operands A' and B' or a result C from the addition of A' and B' from ALU1 610 in the first clock cycle. ALU2 then continues the processing to yield the desired result in the second clock cycle. Thus, for a floating point add/subtract, ALU1 and ALU2 are used sequentially rather than in parallel as in the case for integer multiply and MAC operations.

In ALU1 610, an align circuit 710 compares the 8-bit exponent values of operands A and B during the first clock cycle. Align circuit 710 then shifts the 23-bit mantissa of the smaller operand to the right by a number of bits equal to the difference between the exponents, which provides aligned operands A' and B'. The larger exponent is the common exponent for the result. The aligned operands A' and B' are then transferred to adder 730 of ALU1 610 for further processing during the first clock cycle or to adder 735 of ALU2 620 for processing during a second clock cycle depending on whether the magnitude of the difference between the exponents is less than or equal to one, i.e. whether the shift amount was one or zero bits. If a mantissa was shifted by more than one bit, align circuit 710 outputs the aligned operands A' and B' to adder 730 of ALU2 620 for processing in the second clock cycle. Otherwise, ALU1 610 continues processing in the first clock cycle by adding the 23-bit mantissas of aligned operands A' and B' in adder 730. Circuitry and designs for shifter and adders described for ALU1 are well known in the art.

ALU2 620 then completes the processing started by ALU1 610 in the second clock cycle. If the mantissa was shifted by more than one bit, adder 730 of ALU2 620 adds the 23-bit aligned mantissas A' and B'. A normalization circuit 740 uses conventional methods to normalize the result C from adder 730 or 735 of either ALU1 610 or ALU2 620. The reason adding is performed in either ALU1 610 or ALU2 620 depending on the mantissa shift amount is to complete the floating point add/subtract operation in two clock cycles. If the mantissa is shifted by more than one bit, pre-normalization operation dominates so that ALU1 performs the pre-normalization in one cycle and ALU2 performs the adding and post-normalization in the second cycle. However, if the mantissa is shifted by one or zero bits, post-normalization dominates because of the possibility of a large number of leading zeros in the result. Therefore, ALU1 performs both the pre-normalization and adding in the first clock cycle, and ALU2 performs the post-normalization in the second clock cycle. If the result C overflows, the mantissa is right shifted one bit and the common exponent is incremented. Otherwise, the mantissa is shifted left and the common exponent is decremented by the shift amount required to correct the position of the most significant bit of the mantissa. The shift amount is equal to the number of leading zeros and may be determined by a leading zero detector. After normalization, the mantissa is rounded in rounding circuit 750 during the second clock cycle. Rounding circuit 750 rounds the mantissa according to one of four rounding modes: unbiased rounding to the nearest value (RN), rounding toward zero by chopping and truncating (RZ), round toward minus infinity (RM), and round toward plus infinity (RP). Normalization circuit 740 and rounding circuit 750 can be implemented with logic well known in the art.

FIG. 7 also illustrates sharing single-cycle ALUs for executing a floating point multiply operation. In a first clock cycle, multiplier 510 generates a 48-bit partial sum and a 48-bit partial carry from the mantissas of operands A and B. Suitable multipliers are well known in the art and include those mentioned above. In the second clock cycle, adder 730 of ALU1 610 then adds the 36 most significant bits of the partial sum and carry and a 9-bit adder 720 adds the two 9-bit exponent values of A and B. 9-bit adders can be similar to those discussed with respect to integer operations or other types of known designs. In the third clock cycle, normalization circuit 740 of ALU2 620 normalizes and rounding circuit 750 of ALU2 620 rounds the result from adder 730 of ALU1 610 to provide a 36-bit result consisting of a 23-bit mantissa, an eight-bit exponent, and a one-bit sign. The normalization and rounding logic can be the same as for the floating point add/subtract operation discussed above. The results of the processing may then be transferred to accumulator 540 or to multiplexers 185 and 195.

Consequently, multi-cycle instructions of integer multiply and MAC and floating point add/subtract and multiply are implemented by chaining together a single-cycle multiplier, two single-cycle ALUs, and an accumulator. By sharing these small and inexpensive circuits for different operations, a processor size and cost are reduced.

Although the invention has been described with reference to particular embodiments, the description is only an example of the invention's application and should not be taken as a limitation. In particular, even though portions of the preceding discussion referred to the IEEE-754 data format, the fixed integer data types, the 288-bit data width, and four multi-cycle microprocessor instructions, alternative embodiments of this invention apply to other data types, formats, and widths, as well as other multi-cycle operations. Various other adaptations and combinations of features of the embodiments disclosed are within the scope of the invention as defined by the following claims.

APPENDIX

Table A.1 illustrates a method of using a 36-bit adder to perform either one 32-bit addition, two 16-bit additions in parallel, or four 8-bit additions in parallel. Bits 8, 17, and 26 instead of containing bits from addends have values which block a carry from a preceding bit, propagate a carry bit from a preceding bit, or generate a carry. In Table A.1, FB indicates insertion of 0 in the bit location for both addends to block a carry. FG indicates insertion of 1 in the bit location for both addends to generate a carry, and FP indicates insertion of 1 in the bit location for one addend and 0 in the bit location for the other addend to propagate a carry.

TABLE A.1

| Data type/ Bit index | Bit 8 | Bit 17 | Bit 27 |
| --- | --- | --- | --- |
| B8 (8-bit byte) | FB / FG | FB / FG | FB / FG |
| HW (16-bit Half word) | FP | FB/FG | FP |
| WP (32-bit word) | FP | FP | FP |

Where FB/FG means: FB is on if ADD; FG is on if SUBTRACT.

The following describes a subset of an instruction set for an exemplary embodiment of a vector processor in accordance with an embodiment of the invention.

Further description of the instruction set for the exemplary embodiment of the vector processor can be found in co-owned U.S. patent application Ser. No. 08/699,597, entitled "Single-Instruction-Multiple-Data Processing in a Multimedia Signal Processor", filed Aug. 19, 1996, now U.S. Pat. No. 6,058,465, which is incorporated by reference above.

The logical class supports the Boolean data types and is performed by ALU1. Table A.2 lists the logical instructions.

TABLE A.2

Logic Instructions

| Mnemonic | Description |
|---|---|
| VAND | AND - (A & B) |
| VNAND | NAND - ~ (A & B) |
| VOR | OR - (A \| B) |
| VNOR | NOR - ~ (A \| B) |
| VXOR | Exclusive OR - (A ^ B) |
| VXNOR | Exclusive NOR - ~ (A ^ B) |

The shift/rotate class instructions operate on the 8-bit, 9-bit, 16-bit and 32-bit integer data types and is performed by ALU1. Table A.3 lists the shift/rotate class instructions.

TABLE A.3

Shift & Rotate class

| Mnemonic | Description |
|---|---|
| VDIV2N | Divide by $2^n$ |
| VLSL | Logical Shift Left |
| VLSR | Logical Shift Right |
| VROL | Rotate Left |
| VROR | Rotate Right |

The arithmetic class instructions listed in Table A.4, in general, support the 8-bit, 9-bit, 16-bit, 32-bit integer and 32-bit floating point data types. The arithmetic class is performed by various combinations of ALU1, ALU2, Multiplier, and Accumulator.

TABLE A.4

Arithmetic Class

| Mnemonic | Description |
|---|---|
| VASR | Arithmetic Shift Right |
| VADD | Add |
| VAVG | Average |
| VSUB | Subtract |
| VASUB | Absolute of Subtract |
| VMUL | Multiply |
| VMULA | Multiply to Accumulator |
| VMULAF | Multiply to Accumulator Fraction |
| VMULF | Multiply Fraction |
| VMULFR | Multiply Fraction and Round |
| VMULL | Multiply Low |
| VMAD | Multiply and Add |
| VMADL | Multiply and Add Low |
| VADAC | Add and Accumulate |
| VADACL | Add and Accumulate Low |
| VMAC | Multiply and Accumulate |
| VMACF | Multiply and Accumulate Fraction |
| VMACL | Multiply and Accumulate Low |
| VMAS | Multiply and Subtract from Accumulator |
| VMASF | Multiply and Subtract from Accumulator Fraction |
| VMASL | Multiply and Subtract from Accumulator Low |
| VSATU | Saturate To Upper Limit |
| VSATL | Saturate to Lower Limit |
| VSUBS | Subtract Scalar and Set Condition |
| VCMPV | Compare Vector and Set Mask |
| VDIVI | Divide Initialize |
| VDIVS | Divide Step |
| VASL | Arithmetic Shift Left |
| VASA | Arithmetic Shift Accumulator by 1 bit |

Table A.5 list the MPEG instructions. The MPEG instructions support the 8-bit, 9-bit, 16-bit, 32-bit integer data types and is performed by ALU1.

TABLE A.5

MPEG class

| Mnemonic | Description |
|---|---|
| VAAS3 | Add and Add Sign of (−1, 0, 1) |
| VASS3 | Add and Subtract Sign of (−1, 0, 1) |
| VEXTSGN2 | Extract Sign of (−1, 1) |
| VEXTSGN3 | Extract Sign of (−1, 0, 1) |
| VXORALL | XOR the least-significant-bit of all elements |

Each data type conversion instruction supports specific data types. The architecture does not support more than one data type in a register. Table A.6 list the data type conversion instructions, which are performed by ALU1.

TABLE A.6

Data Type Conversion Class

| Mnemonic | Description |
|---|---|
| VCVTIF | Convert Integer to Floating point |
| VCVTFF | Convert Floating Point to Fixed Point |
| VROUND | Round Floating Point to Integer (supports 4 IEEE rounding modes: RN, RZ, RM, and RP) |
| VCNTLZ | Count Leading Zeroes |
| VCVTB9 | Convert Byte9 Data Type |

Table A.7 lists the inter-element arithmetic class of instructions, which are performed by ALU1. The inter-element arithmetic class support the 8-bit, 9-bit, 16-bit, 32-bit integer and 32-bit floating point data types.

TABLE A.7

Inter-element Arithmetic Class

| Mnemonic | Description |
|---|---|
| VAVGH | Average Two Adjacent Elements |
| VAVGQ | Average Quad Elements |
| VMAXE | Maximum Exchange Even/Odd Elements |

The inter-element move class of instructions support the 8-bit, 9-bit, 16-bit, 32-bit integer and 32-bit floating point data types. Table A.8 lists the inter-element move class of instructions, which are performed by ALU3.

TABLE A.8

Inter-element Move Class

| Mnemonic | Description |
|---|---|
| VESL | Element Shift Left by 1 |
| VESR | Element Shift Right by 1 |
| VSHFLH | Shuffle to Even/Odd Elements High |
| VSHFLL | Shuffle to Even/Odd Elements Low |
| VUNSHFLH | Unshuffle to Even/Odd Elements High |
| VUNSHFLL | Unshuffle to Even/Odd Elements Low |

We claim:

1. An apparatus for executing instructions in a processor, comprising:

a register file coupled to receive a data stream formed from a plurality of data bits, wherein the register file divides the data stream into a predetermined number of slices of data bits, and wherein each of the slices comprises adjacent portions of bits in the data stream; and a plurality of execution units coupled to the register file, wherein the number of execution units corresponds to the predetermined number of slices and wherein the plurality of execution units operate independently from and in parallel with each other.

2. The apparatus of claim 1, wherein each of the plurality of execution units comprises:

a first arithmetic logic unit; and a second arithmetic logic unit coupled to the first arithmetic unit, wherein the first and second arithmetic units operate sequentially when executing a first instruction and operate in parallel when executing a second instruction.

3. The apparatus of claim 2, wherein each of the plurality of execution units further comprises:

a multiplier coupled to the first and second arithmetic logic units; and an accumulator coupled to input data and to the first and second arithmetic logic units.

4. The apparatus of claim 3, wherein the first arithmetic logic unit comprises an alignment circuit and adders, and wherein the second arithmetic logic unit comprises a normalization circuit, a rounding circuit, and adders.

5. The apparatus of claim 1, wherein each of the slices of data bits support vector data having multiple data elements and each of the plurality of execution units operates on the vector data having multiple data elements.

6. The apparatus of claim 5, wherein each data element has a data type selected from a set including 8-bit, 9-bit, 16-bit, or 32-bit types.

7. The apparatus of claim 1, wherein each of the plurality of execution units operates on integer or floating-point data.

8. The apparatus of claim 1, wherein each of the plurality of execution units comprises a multiplier, an arithmetic logic unit, and an accumulator.

9. The apparatus of claim 1, wherein the data stream is 288 bits wide and each of the slices of data bits are 36 bits wide.

10. A vector processor comprising:

a register file containing data registers, wherein the data registers are divided into a plurality of data slices, the plurality of data slices corresponding to an input data stream, and wherein each of the data slices comprises adjacent portions of bits in the input data stream; and a plurality of execution units coupled to the data registers, wherein each execution unit operates on one of the data slices in parallel with and independently from other execution units.

11. The vector processor of claim 10, wherein each data slice supports a set of possible data types, the set of possible data types comprising of 8-bit, 9-bit, 16-bit, or 32-bit data types.

12. The vector processor of claim 10, wherein each data slice supports a set of possible data types, the set of possible data types comprising of integer and floating point data type.

13. A method for processing data comprising:

storing a data stream in vector registers;

dividing portions of adjacent bits in the data stream into a plurality of data bit slices; and processing each data bit slice in parallel and independent with other data bit slices.

14. The method of claim 13, wherein the processing comprises multiplication, addition, or accumulation, or a combination of each.

15. The method of claim 13, wherein each data bit slice supports multiple data elements.

16. The method of claim 15, wherein the multiple data types comprise 8-bit, 9-bit, 16-bit, or 32-bit data types.

17. The method of claim 13, wherein the data stream is 288 bits wide and each data bit slice is 36 bits wide.

18. The method of claim 13, wherein said register file is configured to divide said data stream into a predetermined number of data bit slices, and wherein said dividing portions of adjacent bits in the data stream into a plurality of data bit slices is performed in said register file.

19. The method of claim 18, wherein the processing comprises multiplication, addition, or accumulation, or a combination of each.

20. The method of claim 18 wherein each data bit slice supports multiple data elements.

21. The method of claim 20 wherein the multiple data types comprise 8-bit, 9-bit, 16-bit, or 32-bit data types.

22. The method of claim 18, wherein the data stream is 288 bits wide and each data bit slice is 36 bits wide.

* * * * *